May 1, 1973 W. M. FIELDS ET AL 3,730,820

SOFTWOOD-HARDWOOD LAMINATED PANEL

Filed July 19, 1971

WALTER M. FIELDS
RICHARD W. MAYER
*INVENTORS*

BY
BUCKHORN, BLORE, KLARQUIST & SPARKMAN
*ATTORNEYS*

United States Patent Office 3,730,820
Patented May 1, 1973

3,730,820
SOFTWOOD-HARDWOOD LAMINATED PANEL
Walter M. Fields, 13975 SW. 20th, Beaverton, Oreg. 90075; and Richard W. Mayer, 5660 SW. Wilbard, Portland, Oreg. 97219
Filed July 19, 1971, Ser. No. 163,962
Int. Cl. B32b 3/10; E04c 2/00
U.S. Cl. 161—38                               11 Claims

ABSTRACT OF THE DISCLOSURE

A high strength, lightweight, laminated panel includes boards composed of hardwood strips glued to softwood strips.

DESCRIPTION

This invention relates to a laminated panel, and more particularly to a softwood-hardwood panel.

An object of the invention is to provide a new and improved laminated panel.

Another object of the invention is to provide a new and improved softwood-hardwood panel.

A further object of the invention is to provide a panel having hardwood strips with softwood strips between the hardwood strips.

DRAWINGS

Figure 1:
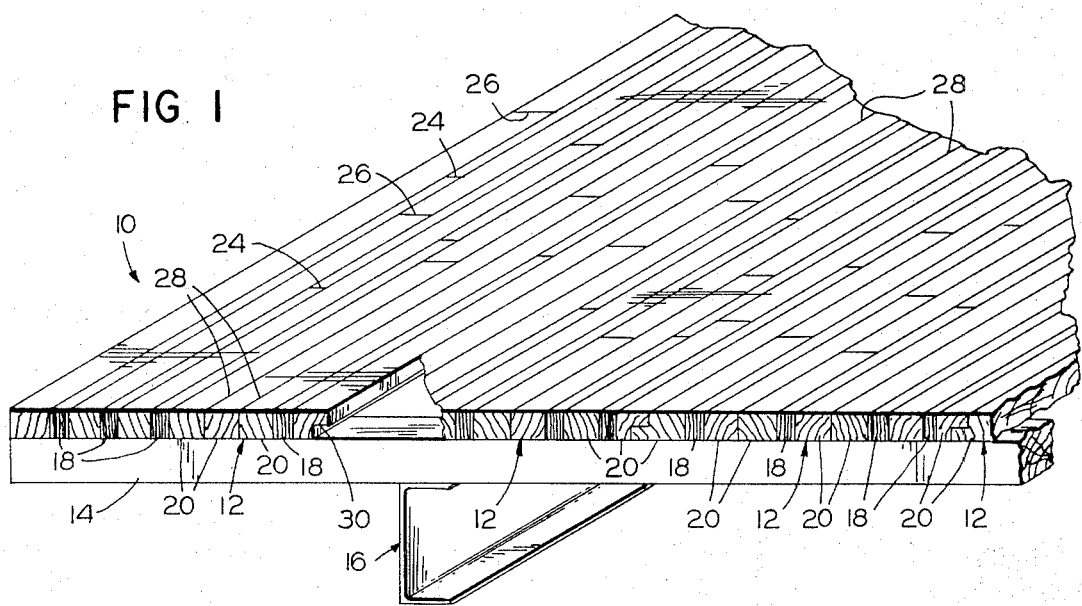
Figure 2:
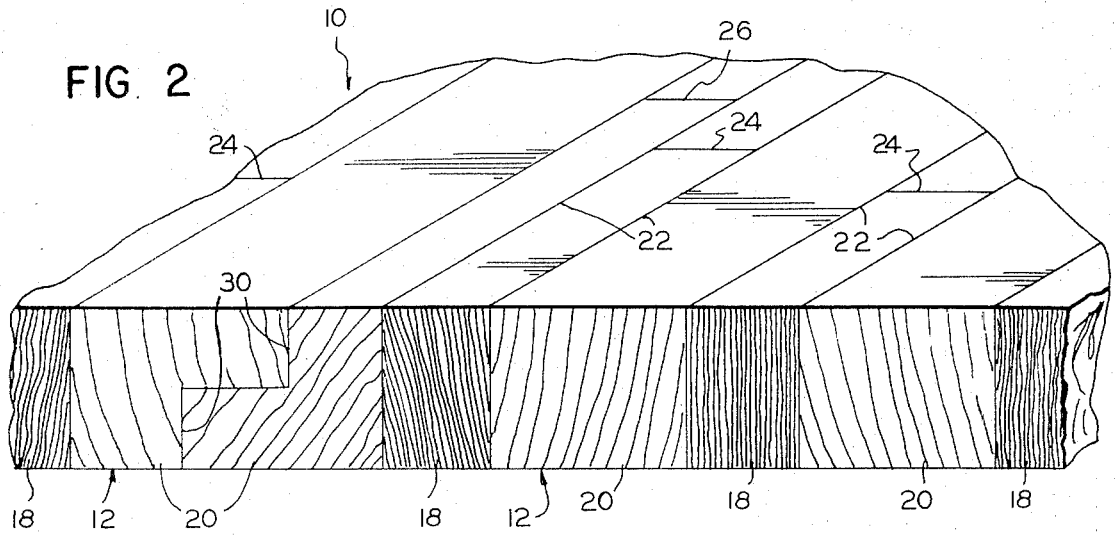

FIG. 1 is a fragmentary, perspective view of a truck structure including a panel forming one embodiment of the invention; and, FIG. 2 is an enlarged fragmentary, perspective view of a portion of the panel of FIG. 1.

Referring now in detail to the drawings, there is shown therein a laminated panel forming one embodiment of the invention and made up of planks 12 secured to wood or steel cross-beams 14 of a truck or trailer frame 16 and forming a floor or deck. The panel may be used in many applications where a high strength and low weight are desired.

The planks 12 are composed of narrow hardwood strips 18 and strips 20 of softwood bonded together, preferably on their flat grain sides by a known, preferably waterproof glue to form glue joints 22. Joints 24 of the hardwood strips and joints 26 of the softwood strips, such as, finger, hook or butt joints, which can be glued or not glued. Preferably the hardwood strips are separated from each other because in many instances, stronger glue joints are formed between hardwood and softwood than would be the case if harwood were glued to harwood. For decking, excellent results have been achieved with each strip 18 having only two sections with, of course, only one joint 24 with each of the strips 20 being formed of several shorter random length sections joined together by a plurality of joints 26. However, each strip 18 may have more than two sections. Occasionally a plurality of adjacent strips 20 of softwood may be glued together to give a wider nailing section and lower weight, while it is preferable to have the stronger, harder, heavier hardwood strips 18 always separated from each other. The hardwood strips 18 act as wear strips and are of lower friction than the softwood strips so that it is easier to slide objects over the deck 10. Edges 30 of the planks 12 are cut in a shiplap design to make for a tighter joint. It will be appreciated that the edges may be tongue and groove or square edge or of other configuration. FIG. 2 illustrates the general direction of the grain. Preferably the strips are cut and glued together so the grain is vertical or edge-grained with the flat grained faces glued together. This gives a long life to the deck and provides strong glue joints 22 and 28.

The combination of the strips 18 and 20 makes the panel very strong while light in weight and with the wearing qualities of the hardwood 18. A panel 10 forming one specific example of the invention included boards or planks 12, twelve inches wide and one-and-one-eighth inches thick. The hardwood strips 18 were of Apitong or Malaysian mahogany thirteen-sixteenths inches thick, and the softwood strips 20 were of Douglas fir one-and-seven-sixteenths inches wide. The thickness of the deck 10 may be greatly reduced over that of an all softwood deck thereby increasing the payload that may be carried. The softwood portions decrease the possibility of cargo slipping over an all hardwood deck, provide excellent nailing strips, and give strong glue bonds. The hardwood portions provide a tough wearing surface. The softwood portions also reduce substantially swelling and shrinking over an all hardwood panel.

The panel has high utility for flooring or decking in truck body floors, truck trailer floors, shipping cargo container floors, bleacher seat boards and other applications where high strength and low weight are needed.

What is claimed is:

1. In a laminated panel, a plurality of softwood strips and a plurality of hardwood strips positioned between the softwood strips and glued to the faces of the softwood strips in edge-to-edge positions.

2. The laminated panel of claim 1 including a plurality of the softwood strips between an adjacent pair of the hardwood strips and secured together by glue.

3. The laminated panel of claim 1 wherein the softwood strips are wider than the hardwood strips.

4. The laminated panel of claim 1 wherein the strips are edge grained.

5. The laminated panel of claim 1 wherein the panel has interlocking edge portions.

6. The laminated panel of claim 1 wherein the softwood strips include random length sections glued end to end.

7. The laminated panel of claim 1 wherein the hardwood strips are narrower than the softwood strips.

8. The laminated panel of claim 1 wherein the softwood strips are of Douglas fir.

9. The laminated panel of claim 8 wherein the hardwood strips are of mahogany.

10. The laminated panel of claim 1 wherein the hardwood strips are of mahogany.

11. In a laminated panel, a plurality of softwood strips and a plurality of hardwood strips, the hardwood strips being positioned between the softwood strips and glued in edge-to-edge contact with the softwood strips to form a board with the softwood strips and the hardwood strips positioned alternately across the width of the board.

References Cited

UNITED STATES PATENTS

| 2,894,292 | 7/1959 | Gramelspacher | 52—474 |
| 2,713,014 | 7/1955 | Johnson | 161—56 X |

FOREIGN PATENTS

| 619,671 | 3/1949 | Great Britain | 161—56 |
| 454,411 | 2/1949 | Canada | 161—56 |

PHILIP DIER, Primary Examiner

U.S. Cl. X.R.

52—474, 622; 144—315; 156—71, 299; 161—56